Patented July 25, 1939

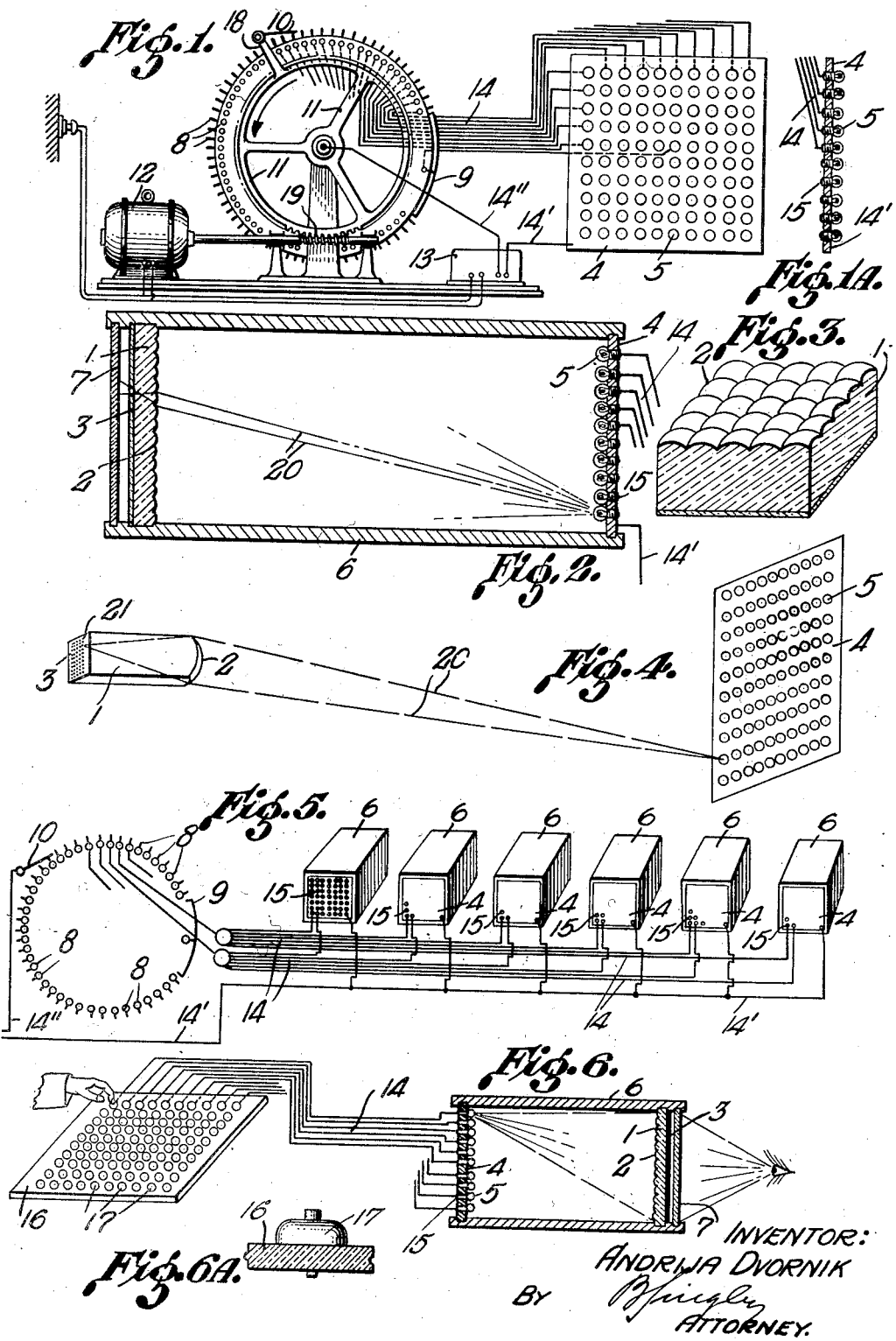

2,167,107

UNITED STATES PATENT OFFICE 2,167,107

DEVICE FOR REPRODUCING CINEMATOGRAPHIC PICTURES

Andrija Dvornik, Zagreb, Jugoslavia

Application July 6, 1936, Serial No. 89,029
In France July 12, 1935

11 Claims. (Cl. 88—16.6)

The invention relates to improvements in a device for reproducing cinematographic pictures and particularly relates to the type of cinematographic pictures produced by the lens-screen process as for instance is disclosed in my French Patent specification No. 762,237 and in my British Patent specification 421,120. In these prior patents I have disclosed the method for taking and exhibiting motion pictures by means of lens-screen plates or lens-screen films. This method is based on the fact that an image projected by a camera lens on a lens-screen is dissected by the action of the screen lenses into a number of relatively very small image points separated by distances corresponding to the spacing of the lenses. These image points are nothing more or less than reproductions of the camera-lens aperture, i. e., the exposing aperture, freely visible to the lens-screen, and formed once by each screen-lens on the photographic layer applied directly on the lens-screen.

According to my prior invention, for the purpose of taking and exhibiting a series of cinematographic picture images, a combined lens-screen and emulsion carrier is employed, the lens-screen consisting of a large number of (spherical or aspherical) lenses having punctiform foci, and this combined lens-screen and emulsion carrier on the one hand, and one or more exposing apertures on the other hand, receive a relative movement, such that the image of each exposing aperture projected on the emulsion layer by each lens-element of the lens-screen is progressively displaced in the field of such screen-lens element.

For reproducing or exhibiting the motion picture thus produced, the plate exposed in the taking operation is developed, for example by photographic reversal to a positive and in place of the exposure aperture employed in taking there is arranged an illuminating surface in the form of a lamp. A screen consisting of a ground glass plate is arranged in rear of the developed plate to receive the projected image. The lamp illuminates the whole lens side of the lens-screen at once and has to be moved in precisely the same manner as the exposing aperture did in taking. In this way the image of the luminous source is concentrated on the emulsion side by each of the screen-lens elements and appears on the same spot at the same relative point of time as the image of the exposing aperture did in taking. While this method of exhibiting the motion picture has certain advantages, it nevertheless has the disadvantage that a comparatively complicated movement of the exposure aperture or the luminous source is necessary in order to fully exploit the entire lens-screen plate.

It is now an object of the present invention to eliminate this disadvantage, which is accomplished by arranging opposite the face of the lens-screen plate a number of electric lamps, which may be energized in any desired sequence and whose arrangement may be as desired.

Another object of the invention is, to arrange the electric lamps in such a manner that the efficiency of the lens-screen plate is the most favorable. Although the lamps may be energized in any desired sequence, it is nevertheless necessary, that in the case of projecting cinematographic pictures, the sequence corresponds with the sequence of the movements which have taken place during the taking of the picture.

In accordance with the present invention a device is employed which energises the different electric lamps successively and in such manner that ordinarily it is not possible to energise two or more lamps simultaneously to the highest intensity. It is, of course, possible to energise, if desired, a number of lamps at the same time, so that for instance three lamps of different color (red, green and blue) are simultaneously energised for the purpose of projecting in this manner colored pictures.

The drawing illustrates various embodiments of the device of the present invention:

Fig. 1 illustrates diagrammatically a device for reproducing cinematographic or individual pictures;

Fig. 1A is a vertical section of the lamp carrying plate of Fig. 1;

Fig. 2 shows in section the projection casing used in connection with the device of Fig. 1 and in which the lamp carrying plate is mounted;

Fig. 3 shows a portion of the lens-screen plate, greatly enlarged and in perspective;

Fig. 4 illustrates diagrammatically the optical effect of a single screen-lens element;

Fig. 5 shows diagrammatically another embodiment of the invention;

Fig. 6 illustrates a device for the transmission of optical signs, pictures etc., and Fig. 6A shows a detail of Fig. 6 on an enlarged scale.

In the embodiment of the invention as illustrated by Figs. 1 to 4, a plate 4 is provided with a number of electric lamps 5. The center terminal 15 of each of these lamps is connected by conductors 14 with contact members 8 and 9 which preferably are mounted on the circumference of a stationary circular member. This circular member is mounted upon a suitable base which also supports an electric motor 12 adapted to rotate by means of a worm 19 a worm wheel 11. The worm gear 11 carries an outwardly extending radial arm 18 provided with a contact member 10 in the form of a leaf spring which successively engages the stationary contact members 8, 9 on the circumference of the circular member when the worm gear 11 is rotated. The contact member 10 slides when the worm gear 11 is rotated in the direction of the arrow, over the contact members 8 and 9 and thereby the lamps 5 are successively and alternately energized during the short interval of time the contact member 10 engages each individual contact member. It will be noted that the contact member 9 extends a substantial distance along the circumference of the circular member and obviously the lamp or lamps connected with this contact member 9 will be energized for a longer time. The lamp circuit is supplied with electric current by a transformer 13. The metallic plate 4 in which the lamps 5 are mounted forms the common conductor for the socket terminals of the lamps and this plate support is connected by a conductor 14' with one terminal of the respective transformed winding, the other terminal of which is connected by a conductor 14" with the worm gear 11 and rotatable contact member 10.

Fig. 2 shows the projection casing 6, one end of which is closed by the lamp carrying plate 4, while the other end is closed by the viewing screen 7 consisting of a ground glass plate or the like. A short distance from said ground glass plate 7 is arranged the lens-screen plate 1 in such manner that the side provided with the lens elements 2 faces the lamps 5 on the lamp carrying plate 4. The other side of the lens-screen plate which carries the emulsion layer 3 or the developed picture faces the ground glass plate 7.

In accordance with the principle of the exhibiting method, as particularly explained in my above mentioned French Patent specification 762,237, the light rays of each lamp 5 are projected by the screen-lens elements onto certain small areas, or punctiform portions of the layer 3. In other words, it is possible to project onto the viewing screen 7 as many different pictures as lamps are mounted on the plate 4. Fig. 1 shows by way of example one hundred lamps and in this case one hundred different pictures may be projected. Depending upon the speed with which the wheel 11 is driven the pictures can be reproduced at the ordinary speed of cinematographic reproduction or at less speed.

Fig. 4 illustrates on an enlarged scale the optical effect. Each screen-lens element 2 registers upon the pertaining layer 3 all the lamps 5. The rays 20 emitted from each lamp 5 are concentrated by the lens elements 2 in points 21 from which the composite picture is assembled.

In the modified embodiment of the device as illustrated by Fig. 5, the left hand portion of the figure shows more diagrammatically the contact device as shown in the left hand portion of Fig. 1. However, the conductors 14 are not connected with the lamps 5 of a single projection casing 6, but are each connected to a series of casings 6 as is shown by the right hand portion of Fig. 5. In this way it is posisble to employ a number of projection casings simultaneously whereby each casing may be installed at a different location.

Fig. 6 shows the device of the invention modified for the transmission of optical signals. The contact device used in the two embodiments of Figs. 1 and 5 is replaced by a switch board with contacts or contact buttons 17. In other respect the electrical connections are the same as described in the foregoing. It is possible to arrange the contacts 17 greater distances apart, whereby if desired more than one switch board can be employed to accommodate the desired number of contacts.

It is believed to be obvious that the device of the invention may be constructed and assembled in various manner and that the invention is not limited to the embodiments described in this specification and shown in the drawing.

What I claim as my invention is:

1. A device for projecting a series of pictures comprising a transparent stationary plate having a multiplicity of lenses in close juxtaposition on one face, a stationary transparent carrier for dissociated records of pictures on the other face of said lens plate all of said lenses having their respective punctiform foci in the plane of said record carrier, a plurality of stationary sources of light facing the lenses of said lens plate and in a common plane, means for successively energizing said sources of light to illuminate the lens plate, the space between said sources of light and said lens plate being unobstructed, the dissociated records on the transparent carrier being arranged in groups on the carrier, the lenses of said plate being adapted to concentrate the rays of light striking the same to different records out of each group of dissociated records on the carrier depending upon the source of light which had been energized the different records illuminated upon each energization of said stationary sources of light in all groups having the same relation to the other records in each group.

2. A device for projecting a series of pictures comprising a transparent stationary plate having a multiplicity of lenses in close juxtaposition on one face, a transparent carrier for disassociated records of pictures on the other face of said lens plate, the records of all pictures being arranged in groups and occupying in all groups identical relations to the other records, the areas covered by all groups having equal size, a plurality of stationary sources of light facing the lenses of said lens plate, and power actuated means for successively energizing and deenergizing in predetermined sequence said sources of light, the path of light from said sources to said lens plate being unobstructed, the lenses of said plate being adapted to condense the rays of light striking the same upon different correlated records out of each group of dissociated records on the carrier.

3. A device for projecting a series of pictures from a single carrier located within a plane comprising a lens plate having a multiplicity of lenses in close juxtaposition, the record carrier being transparent and being secured to the front face of the transparent lens plate, a projection screen in front of said carrier, and a plurality of stationary sources of light in the rear of said lens plate, the device also comprising means for successively energizing in predetermined sequence said sources of light for illuminating the lens plate, the carrier of records being disposed in the common focal plane of all of said lenses on the plate, and the lenses of the plate being adapted to illuminate different correlated records out of the group of dissociated records on the carrier depending upon the source of light which had been energized.

4. A device for projecting a series of pictures comprising in combination with a transparent plate having on one of its faces a multiplicity of substantially circular condenser lenses in close juxtaposition, a plane transparent support of a record of a plurality of images to be projected in front of said transparent plate, said record of the plurality of images containing the images in the form of groups of individual image elements spaced from each other horizontally and laterally in the plane of the support, the distribution of the groups over the area of the record being correlative with the distribution of the lenses on the lens plate, each group of image elements containing image elements of all images in the series, a plurality of sources of light facing the lens face of the lens plate, and means for successively energizing and deenergizing said sources of light to illuminate said lens plate under different angles, whereby the lenses of said plate are adapted to condense the light upon different correlated image elements, each individual source of light being adapted to project one individual image only.

5. A device for selectively projecting a series of pictures comprising a stationary transparent plate integral with a multiplicity of substantially circular lenses on one face of the plate, said lenses all having punctiform foci in the opposite face of the plate and the lenses being arranged in close juxtaposition on said face, a stationary transparent carrier of a record of a plurality of images on said opposite face of the plate, the images being disposed on the carrier in the form of groups of individually spaced image elements, the distribution of the groups of spaced image elements over the record being correlative with the distribution of the lenses on the lens plate, and said record carrier being located in the plane in which the punctiform foci of all of the lenses are located, a plurality of stationary sources of light facing the lens face of the lens plate the path of light between said sources and the lens plate being unobstructed, said sources of light being disposed in a common plane, and means for successively energizing and deenergizing said sources of light selectively, whereby the lens plate is illuminated from the different sources of light under different angles so that the lenses of said plate focusing the rays of light directed thereupon concentrate said light upon different image elements,—all of said image elements upon which said light emanating from one source is concentrated pertaining to the same image, each individual source of light thereby projecting one individual image only.

6. A device for projecting a series of pictures comprising a stationary transparent plate having on one face a multiplicity of substantially circular lenses having punctiform foci, all located in one plane, a stationary translucent carrier of a record of a series of images, said images being disposed on said carrier in the form of groups of individual spaced image elements, a plurality of stationary sources of light arranged in a common plane facing the lens plate the path of light between said sources and said lens plate being free of obstructions, and power actuated means for successively energizing and deenergizing in predetermined sequence said sources of light to illuminate said lens plate upon each energization under a different angle, whereby the lenses of said lens plate are adapted to condense the rays of light striking the same upon different image elements, the image elements upon which the light emanating from the several lamps is concentrated pertaining to the same group, so that each individual source of light projects a single image only.

7. A device for selectively projecting a series of pictures at selectively determined intervals comprising a stationary transparent plate provided with a multiplicity of transparent substantially circular shaped lenses having punctiform foci, a stationary transparent carrier of a record of a series of images, each image being subdivided into individual spaced image elements, the image elements of all of the images of the series being arranged in groups distributed over the transparent carrier in accordance with the grouping of the circular shaped lenses on the transparent plate, the image carrier being disposed in the common focal plane of all of said lenses on the plate, a plurality of stationary sources of light arranged in a common plane parallel to the plane of the lens plate, and means for selectively energizing at selectively predetermined intervals said sources of light and for deenergizing said sources of light to illuminate said lens plate under different angles, whereby the lenses of the plate are adapted to irradiate the different image elements, each individual source of light projecting one individual image only.

8. A device for selectively projecting a series of pictures at selectively determined intervals, comprising a stationary transparent plate provided with a multiplicity of transparent substantially circular shaped lenses having punctiform foci all disposed in a common plane, a stationary transparent carrier bearing a record of a series of images in the form of groups of individual spaced image elements, the image elements pertaining to the same image having in all groups the same relation with respect to other image elements, the carrier being disposed in the common focal plane of the lenses, a plurality of stationary sources of light arranged in a common plane parallel to the plane of the lens plate, and means for selectively energizing and alternately deenergizing at selectively determined intervals the sources of light to illuminate said lens plate under different angles, said energizing means being adapted to deenergize each lamp prior to the energization of any other lamp, whereby the lenses of the plate are adapted to condense the light emanating from each of said sources to a different image element, each individual source of light thereby projecting a single individual image only.

9. A device for projecting a series of pictures comprising as a self-contained structure a housing, a stationary plate provided with a multiplicity of transparent substantially circular shaped lenses having punctiform foci in a common plane, a transparent carrier of a record of a series of images, the images being composed of individual spaced image elements, the image elements of all of the images being arranged in groups on the carrier and having in each group identical relation to corresponding image elements of other images, the carrier being secured to the face of the lens plate opposite the face provided with the circular shaped lenses and being in the common focal plane of all of said lenses, a projection screen in front of said carrier, a plurality of stationary lamps disposed in a common plane and facing the lens face of said lens plate within the interior of the housing, and means for successively and alternately energizing and deenergizing said lamps to illuminate said lens plate under different angles whereby the lenses of said plate are adapted to condense the light emanating from the different lamps upon different image elements in the focal plane of said lenses, so that each individual lamp projects one individual image only upon the projection screen.

10. A device for projecting a continuous cinematographic display comprising a series of boxes, each box containing a stationary plate consisting of a multiplicity of transparent substantially circular shaped lenses on one face, said lenses having punctiform foci all in a common plane in the opposite face, and a transparent carrier of a record of a series of images composed of individual spaced image elements, the image elements of all of the images being arranged in groups distributed over the transparent carrier and the image elements in each group having the same relation to corresponding image elements as in all other groups, the carrier being fastened to that face of the lens plate in which the foci of the lenses are located, the box also containing a projection screen in front of said carrier, the device, furthermore, comprising a plurality of stationary electric lamps arranged in a common plane facing the lens face of the lens plate, and an electric commutator unit common to all of the boxes for cinematographically energizing and deenergizing in predetermined sequence said incandescent lamps in all of the boxes simultaneously to illuminate the lens plates of all of the boxes with each illumination under a different angle, whereby the lenses of the plate are adapted to concentrate the light emanating from the lamps upon different image elements in each group so as to project on the projection screen of the box pertaining thereto a single image only.

11. A device for projecting successively a series of pictures comprising a transparent plate having on one face a multiplicity of lenses in close juxtaposition, said lenses having punctiform foci in the opposite face of the transparent plate, a transparent carrier of picture records on said opposite face of the lens plate, the picture records being arranged in a plurality of groups in said carrier and each record pertaining to the same picture occupying within all of the groups the same position with respect to the other records of the group, a plurality of stationary sources of light facing the lenses of said lens plate, and means for succesively energizing and alternately deenergizing said sources of light to illuminate said lens plate successively from said several stationary sources of light, the lenses of said plate being adapted upon each illumination by said several sources of light to concentrate the light upon different records of each group of the record carrier.

ANDRIJA DVORNIK.